3,329,571
METHODS FOR TREATING DEPRESSION
Leonard M. Rice, Baltimore, Md., and Meier E. Freed, Philadelphia, Pa., assignors to American Home Products Corporation, New York, N.Y., a corporation of Delaware
No Drawing. Filed Feb. 3, 1965, Ser. No. 430,204
3 Claims. (Cl. 167—65)

This application is a continuation-in-part of our copending application U.S. Ser. No. 147,190, filed Oct. 24, 1961, now Patent No. 3,282,942.

This invention relates to novel compounds possessing valuable pharmacological properties affecting the central nervous system. They are of value as antidepressants, and as inhibitors of appetite (especially in combination with amphetamine or other phenethylamine derivatives). Additionally, they have useful ataractic or tranquilizing action, and some exhibit analgesic-like action.

The pharmacologically valuable compounds of this invention are N-substituted 2,3-polymethyleneindoles and may be represented by the following formula:

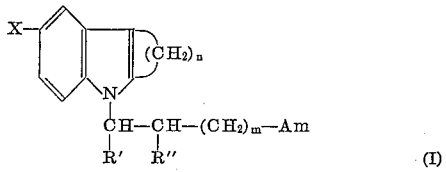

(I)

wherein X represents hydrogen, halogen, methyl, nitro, amino, hydroxy, or lower alkoxy, $m$ is an integer of from zero to four, inclusive, preferably zero to one, $n$ is an integer of from no less than five to thirteen, inclusive, preferably from five to eight, R' is hydrogen or phenyl, R" is hydrogen or methyl, and Am is a primary, secondary, or tertiary amino radical containing no more than about eight carbon atoms; thus Am may represent an unsubstituted —$NH_2$ radical, an —$NH_2$ radical substituted by one or two lower alkyl or hydroxy lower alkyl radicals, or a cyclic amino radical such as the morpholino, piperidino, pyrrolidino, piperazino, N-lower alkyl piperazino, and N-(lower hydroxyalkyl)-piperazino radicals.

The above defined compounds, it will be noted, are aliphatic amines, and are preferably administered in the form of their salts with pharmaceutically acceptable acids, which may include acids such as hydrochloric, hydrobromic, sulfuric, phosphoric, citric, malic, maleic, propionic, acetic, or fumaric, and the like.

The compounds (I) of this invention may be prepared by relatively simple procedures from the corresponding 2,3-polymethyleneindoles having the formula

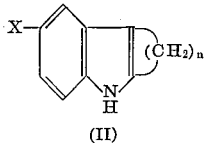

(II)

where X and $n$ have the above meanings.

A convenient method is to convert the parent 2,3-polymethyleneindole to its sodio derivative by treatment with sodium hydride, and then to contact this with an appropriate dialkylaminoalkyl halide, resulting in the formation of the N-(dialkylaminoalkyl) - 2,3-polymethyleneindole compound of this invention. In some instances it is more convenient to prepare the N-(haloalkyl) polymethyleneindole and then permit this to react with a suitable amino compound with elimination of the elements of a molecule of hydrogen halide. In all cases, however, in order to obtain the particular advantage of the invention, wherein the novel compounds thereof surprisingly have specific value as antidepressants; it is essential that, in said compounds (I), $n$ is an integer of from no less than five and up to thirteen. As a practical matter, then, the 2,3-polymethyleneindole starting materials (II) chosen wherein $n$ has precisely the same value as the latter is to have in the final compound (I).

The new pharmacologically active compounds of this invention may be administered parenterally or orally after being combined with suitable solvents, carriers, buffers, fillers, and the like.

The preparation of the compounds of this invention is illustrated by the following examples.

EXAMPLE 1

*1-(gamma-dimethylaminopropyl)2,3-pentamethyleneindole*

A solution of 2,3-pentamethyleneindole (18.53 grams, 0.1 mole) in 100 cc. of dimethylformamide is added slowly to 2.9 grams (0.12 mole) of sodium hydride (as 6 grams of 48% dispersion), suspended in 50 cc. of dimethylformamide by vigorous stirring. The temperature is slowly elevated to 30–35° C. until hydrogen is no longer evolved. Freshly distilled gamma-dimethylaminopropyl chloride (12.1 grams, 0.1 mole) is then added to the suspension of 1-sodio-2,3-pentamethyleneindole and the mixture stirred and heated to 50° C. for 6 hours. The reaction is quenched by pouring into 300 cc. of ice-water. This is extracted 3 times with 200 cc. ether. The ether layer is washed with saturated sodium chloride solution, and then washed well with 2 N hydrochloric acid. This aqueous acid extract is washed with a little ether and then made basic and re-extracted with ether. This ether extract is dried, the solvent evaporated, and the residue is dissolved in absolute ethanol; dry hydrogen chloride is passed through until the solution is strongly acidic, and the resulting precipitate is then removed by filtration. After recrystallization from ethanol-acetone the hydrochloride melts at 207–208° C.

*Analysis.*—Calculated for $C_{18}H_{27}N_2Cl$: N, 9.13; Cl, 11.57. Found: N, 9.25; Cl, 11.60.

EXAMPLE 2

*1-(gamma-dipropylaminopropyl)-2,3-pentamethyleneindole*

Gamma-dipropylaminopropylchloride (17.7 grams, 0.1 mole) is added to a stirred suspension of 1-sodio-2,3-pentamethyleneindole (20.18 grams, 0.1 mole, prepared in the usual manner from 18.5 grams of 2,3-pentamethyleneindole and 6 grams of 48% sodium hydride dispersion) is 150 ml. of dimethylformamide. After stirring for 6 hours at 35–40° C., the mixture is poured into ice-water and the oil layer extracted with ether. After being washed with aqueous sodium chloride solution, the ether extract is washed several times with 100 ml. portions of 2 N hydrochloric acid. The ether layer is discarded; the aqueous acid is basified with sodium hydroxide and the oil extracted into ether. The ethereal solution is washed with aqueous sodium chloride and dried over anhydrous sodium sulfate. After removing the solvent, the product is obtained by vacuum distillation as a viscous yellow oil, B.P. 180–183° C./0.1 mm.

*Analysis.*—Calculated for $C_{22}H_{34}N_2$: C, 81.15; H, 10.48; N, 8.57. Found: C, 81.43; H, 10.32; N, 8.72.

Maleic acid salt (from $CH_2Cl_2$—$Et_2O$) M.P. 101–102.

*Analysis.*—Calculated for $C_{26}H_{38}N_2O_4$: C, 70.60; H, 8.62; N, 6.33. Found: C, 70.74; H, 8.68; H, 6.43.

Treatment of 5.0 grams of the base in 50 ml. of isopropanol with 5 ml. of methyl iodide yields a white crystalline methiodide, M.P. 186–187° C.

*Analysis.*—Calculated for $C_{23}H_{37}N_2I$: N, 6.00. Found: N, 5.72.

EXAMPLE 3

*1-(gamma-dimethylaminopropyl)-2,3-hexamethyleneindole*

Gamma-dimethylaminopropylchloride (12.1 grams, 0.1 mole) is added to a well-stirred suspension of 5-sodio-2,3-hexamethyleneindole (from 19.5 grams, 0.1 mole of 2,3-hexamethyleneindole and 6 grams, 0.1 mole, of 48% sodium hydride dispersion) in 150 cc. of dimethylformamide. After 6 hours, the reaction mixture is poured into 500 cc. of ice-water and the oil layer extracted into ether. The ether extract is washed with water and the aqueous fraction discarded. The ether solution is then extracted with N HCl until acidic, then with water. The aqueous acid solution is washed with ether. After basifying the aqueous solution, the product is extracted into ether, and the ether solution washed with water and dried. Concentration yields an orange oil. This is dissolved in absolute ethanol, and dry HCl is added until strongly acidic. On addition of ether the product hydrochloride crystallizes out. After recrystallization from ethanol-ethyl acetate-ether it melts at 146°–147° C. Yield: 1.49 grams (46.7%).

*Analysis.*—Calculated for $C_{19}H_{29}N_2Cl$: N, 8.7; Cl, 11.06. Found: N, 8.59; Cl, 10.90.

In a similar manner, 1-(gamma-dimethylamino-beta-methylpropyl)-2,3-hexamethyleneindole may be prepared from the sodio derivative of 2,3-hexamethyleneindole and gamma-dimethylamino-beta-methylpropyl chloride.

EXAMPLE 4

*1-(beta-dimethylaminopropyl)-2,3-pentamethyleneindole*

18.5 grams (0.1 mole) of 2,3-pentamethyleneindole and 6 grams sodium hydride dispersion (48%, 0.12 mole) in 100 cc. of dimethylformamide is stirred and warmed to 40° C. To this is added 12.1 grams (0.1 mole) of dimethylaminoisopropyl chloride, and the reaction mixture is stirred and warmed (40° C.) for 6 hours. The suspension is poured into ice-water (250 cc.) and acidified with concentrated hydrochloric acid. The hydrochloride product crystallizes from the solution, is separated by filtration, and recrystallized from absolute ethanol. M.P. 189–190° C. Yield: 15.5 grams (50.5%).

*Analysis.*—Calculated for $C_{18}H_{27}ClN_2$: N, 9.13; Cl, 11.57. Found: N, 9.13; Cl, 11.53.

EXAMPLE 5

*1-(beta-piperidinoethyl)-2,3-pentamethyleneindole*

A solution of 18 grams (0.1 mole) 2,3-pentamethyleneindole in 50 ml. of dimethylformamide is added slowly to 6 grams of 48% sodium hydride dispersion suspended in 50 ml. of the same solvent. This is stirred at 30–35° C. until the evolution of hydrogen ceases. To the stirred suspension is added 14.7 grams (0.1 mole) of freshly distilled 1-(beta-chloroethylpiperidine). After 16 hours the contents of the flask are poured into 300 cc. of ice-water and acidified with concentrated hydrochloric acid. The solution is then extracted well with ether to remove non-basic components. The aqueous acid solution is then made alkaline with 40% sodium hydroxide, and the oil which separates is extracted into ether. The ether solution is then washed with saturated salt solution and dried over sodium sulfate. The solvent is removed and the residual oil dissolved in 50 cc. of ethanol. Dry hydrogen chloride is bubbled through the solution until acidic. Acetone is then added until crystallization occurs. The product is filtered off, washed with ethanol-acetone, then with acetone and dried at 80° C./0.2 mm. The hydrochloride salt has M.P. 209–210°. Yield: 15.8 grams (43.8%).

*Analysis.*—Calculated for $C_{20}H_{29}ClN_2$: N, 8.44; Cl, 10.66. Found: N, 8.43; Cl, 10.42.

EXAMPLE 6

*1-(beta-diethylaminoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.12 mole) dispersion (48%) in 50 ml. of the same solvent. The temperature is slowly elevated by heating to 30–35° until hydrogen is no longer evolved. Freshly distilled diethylaminoethyl chloride (12.1 grams, 0.1 mole) is then added drop-wise and the mixture stirred and heated to 50° for 6 hours. The reaction is quenched by pouring into 300 ml. of ice-water. Concentrated hydrochloric acid is added until a nearly clear solution results (15–20 ml.) and this is extracted several times with ether. The aqueous layer is made strongly alkaline and the product taken up in ether. The ethereal solution is washed with a saturated aqueous solution of sodium chloride, dried, and the solvent removed under reduced pressure. The product is dissolved in 50 ml. of isopropanol, and fumaric acid (4.8 grams) in 200 ml. of isopropanol is added. The resulting salt is recrystallized from isopropanol. Yield: 13.8 grams (34.5%) M.P. 187–188°.

*Analysis.*—Calculated for $C_{23}H_{32}N_2O_4$: C, 69.20; H, 8.05; N, 6.98. Found: C, 69.48; H, 8.02; N, 7.28.

Treatment of 5.0 grams of the base in 50 ml. of isopropanol with 5 ml. of methyl iodide yields a white crystalline methiodide. M.P. 186–187°.

*Analysis.*—Calculated for $C_{20}H_{31}IN_2$: N, 6.58; I, 29.55. Found: N, 6.65; I, 29.15.

EXAMPLE 7

*1-(beta-morpholinoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.1 mole) dispersion (48%) in 50 ml. of the same solvent. The temperature is slowly elevated by heating to 30–35° until hydrogen is no longer evolved. Freshly distilled 1-(beta-chloroethyl) morpholine (14.9 grams, 0.1 mole) is then added drop-wise and the mixture stirred and heated to 50° for 6 hours. The reaction is quenched by pouring into 300 ml. of ice-water. Concentrated hydrochloric acid is added until the mixture is acidic (15–20 ml.) and it is then extracted several times with ether. The aqueous layer is separated, and on standing the hydrochloride salt precipitates. The precipitate is collected on a funnel, washed with cold water, and dried. The salt is recrystallized from dilute hydrochloric acid. Yield: 24 grams (71.6%). M.P. 181–182°.

*Analysis.*—Calculated for $C_{19}H_{27}ClN_2O$: N, 8.37; Cl, 10.58. Found: N, 8.35; Cl, 10.45.

EXAMPLE 8

*1-(beta-pyrrolidinoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.12 mole) dispersion (48%) in 50 ml. of the same solvent. The temperature is slowly elevated by heating to 30–35° until hydrogen is no longer evolved. Freshly distilled 1-(beta-chloroethyl) pyrrolidine (13.5 grams, 0.1 mole) is then added drop-wise and the mixture stirred and heated to 50° for 6 hours. The reaction is quenched by pouring into 300 ml. of ice-water. Concentrated hydrochloric acid is added until a nearly clear solution results (15–20 ml.) and this is extracted several times with ether. The aqueous layer is made strongly alkaline and the product taken up in ether. The ethereal solution is washed with a saturated aqueous solution of sodium chloride, dried, and the solvent removed under reduced pressure. Distillation of the residue yields 9 grams of base, B.P. 193–6/.2 mm. The product is dissolved in 50 ml. of acetone and converted to an acid addition salt by addition to a hot solution of fumaric acid in 250 ml. of acetone. Yield: 13 grams (32.6%) M.P. 244–245°.

*Analysis.*—Calculated for $C_{23}H_{30}N_2O_4$: C, 69.30; H, 7.55; N, 7.03. Found: C, 69.20; H, 7.41; N, 7.15.

EXAMPLE 9

*1-(gamma-aminopropyl)-2,3-pentamethyleneindole*

(a) Acrylonitrile, 11 grams (0.2 mole), is added slowly with cooling to a solution of 2,3-pentamethyleneindole, 37 grams (0.2 mole), and 4 ml. of trimethylbenzylammonium methoxide (40% in methanol) in 100 ml. of benzene. The reaction temperature reaches 50° and then drops slowly. After stirring for an additional hour, 5 ml. of concentrated hydrochloric acid is added. The benzene solution is washed well with water, and then dried over sodium sulfate. The solution is concentrated and the residue crystallized from acetone-methanol. Yield of 1 - (beta-cyanoethyl) - 2,3-pentamethyleneindole: 27 grams (56.6%) M.P. 95–96°.

*Analysis.*—Calculated for $C_{16}H_{18}N_2$: C, 80.50; H, 7.60; N, 11.78. Found: C, 80.41; H, 7.64; N, 11.76.

(b) A solution of 24 grams (0.1 mole) of 1-(beta-cyanoethyl)-2,3-pentamethyleneindole in 100 ml. of dry benzene is added slowly to a stirred suspension of 6 grams of lithium aluminum hydride (0.15 mole) in 500 ml. of dry ether. The mixture is heated to reflux and stirred overnight. Water, 30 ml., is added slowly with cooling. One hour after addition is completed the mixture is filtered and the filtercake washed well with ether. After removing the solvent the residue is distilled. This yields 20 grams (81.5%) 1-(gamma-aminopropyl)-2,3-pentamethyleneindole, B.P. 190–192/0.7 mm.

*Analysis.*—Calculated for $C_{16}H_{22}N_2$: C, 79.25; H, 9.22; N, 11.58. Found: C, 78.99; H, 9.18; N, 11.61.

A sample is converted to the hydrochloride salt which is recrystallized from methanol-acetone; M.P. 271–272°.

*Analysis.*—Calculated for $C_{16}H_{23}ClN_2$: N, 10.05; Cl, 12.72. Found: N, 10.15; Cl, 12.75.

EXAMPLE 10

*1-(gamma-dimethylaminopropyl)-2,3-pentamethylene-5-fluoroindole hydrochloride*

This is prepared in the manner of Example 1 using 10.15 grams (0.05 mole) of 2,3-pentamethylene-5-fluoroindole, 3 grams sodium hydride (48%), and 6.08 grams of gamma-diethylaminopropylchloride in 75 cc. of dimethylformamide. The product (base) has B.P. 178–180/.3 mm.; product (hydrochloride) has M.P. 177–170°.

*Analysis.*—Calculated for $C_{18}H_{25}N_2F$ (base): C, 74.95; H, 8.73; N, 9.70. Found: C, 74.75; H, 8.76; N, 9.72. Calculated for $C_{18}H_{26}N_2FCl$ (hydrochloride): N, 8.64; Cl, 10.92. Found: N, 8.65; Cl, 10.92.

The 2,3-pentamethylene-5-fluoroindole used as starting material in the example is prepared from p-fluorophenylhydrazine and cycloheptanone according to the procedure outlined in the second paragraph of Example 11. It melts at 114–115° C.

Calculated for $C_{13}H_{14}FN$: C, 76.80; H, 6.96; N, 6.90. Found: C, 76.80; H, 7.02; N, 7.06.

EXAMPLE 11

*1-(gamma-dimetylaminopropyl)-2,3-pentamethylene-5-chloroindole*

This is prepared as per Example 1, using 11 grams (0.05 mole) of 2,3-pentamethylene-5-chloroindole, 3 grams sodium hydride (48%) and 6.08 grams gamma-dimethylaminopropylchloride. The product (base) has a B.P. of 185–188°/.05 mm. Yield: 9.5 grams (62.5%). The fumaric salt has M.P. 141–142°.

*Analysis.*—Calculated for $C_{18}H_{25}N_2Cl$ (base): C, 70.80; H, 8.26; N, 9.18. Found: C, 70.88, H, 7.94; N, 9.17. Calculated for $C_{22}H_{29}O_4N_2Cl$ (fumarate): C, 62.80; H, 6.94; N, 6.67. Found: C, 62.69; H, 6.82; N, 6.61.

To prepare the 2,3-pentamethylene-5-chloroindole employed as starting material in the preparation, 44 g. of p-chlorophenylhydrazine (0.31 mole) is added to 34 g. (0.31 mole of cycloheptanone in 250 ml. of glacial acid, and the mixture is heated under reflux for two hours and then cooled. The crystalline product is filtered off and recrystallized from methanol. The 2,3-pentamethylene-5-chloroindole melts at 131–132° C.

*Analysis.*—Calculated for $C_{13}H_{14}ClN$: Cl, 16.15; N, 6.38. Found: Cl, 16.05; N, 6.10.

EXAMPLE 12

*1-(beta-dimethylaminoethyl)-2,3-pentamethyleneindole*

This is prepared in the same manner as Example 1, using 9.26 grams (0.05 mole) 2,3-pentamethyleneindole, 3.0 grams sodium hydride and 5.38 grams of beta-dimethylaminoethylchloride. The product has a B.P 131–136°/0.05 mm. Fumarate salt: M.P. 219–221°.

*Analysis.*—Calculated for $C_{17}H_{24}N_2$ (base): C, 79.63; H, 9.44; N, 10.93. Found: C, 79.65; H, 9.29; N, 11.00. Calculated for $C_{21}H_{28}O_4N_2$ (fumarate): C, 67.72; H, 7.58; N, 7.52. Found: C, 67.70; H, 7.38; N, 7.41.

EXAMPLE 13

*1-(beta-dimethylaminoethyl)-2,3-hexamethyleneindole*

This is prepared in the same manner as Example 3, using 2,3-hexamethyleneindole, 9.96 grams; 3.0 grams sodium hydride (48%); and 5.38 grams beta-dimethylaminoethyl chloride.

The product base has B.P. 180–183°/.3; fumarate M.P. 198.5–201°.

*Analysis.*—Calculated for $C_{18}H_{26}N_2$ (base): C, 79.95; H, 9.69; N, 10.36. Found: C, 79.85; H, 9.46; N, 10.34. Calculated for $C_{22}H_{30}N_2O_4$ (fumarate): C, 68.36; H, 7.82; N, 7.25. Found: C, 68.32; H, 8.04; N, 7.28.

EXAMPLE 14

*1-(beta-piperidinoethyl)-2,3-hexamethyleneindole*

This is prepared essentially according to Example 5 from 2,3-hexamethyleneindole (9.96 g., 0.05 M), sodium hydride (3.0 g. of 48% dispersion, 0.055 M), N-beta-chloroethylpiperidine (7.38 g., 0.05 M) in dimethylformamide (95 ml.). Fumarate M.P. 224–224.5° C. (dec.).

*Analysis.*—Calculated for $C_{25}H_{34}N_2O_4$: C, 70.39; H, 8.03; N, 6.57. Found: C, 70.30; H, 8.16; N, 6.44.

EXAMPLE 15

*1-(gamma-dimethylaminopropyl)-2,3-tridecamethyleneindole*

This is prepared essentially according to Example 1 from 2,3-tridecamethyleneindole (8.93 g., 0.03 M), sodium hydride (1.8 g. of 48% dispersion, 0.033 M), gamma-dimethylaminopropylchloride (3.7 g., 0.03 M) in dimethylformamide (65 ml.). Fumarate M.P. 147.5–149° C.

*Analysis.*—Calculated for $C_{30}H_{46}N_2O_4$: C, 72.25; H, 9.30; N, 5.62. Found: C, 72.11; H, 9.38; N, 5.71.

EXAMPLE 16

*1-(alpha-phenyl-beta-dimethylaminoethyl)-2,3-pentamethyleneindole*

This is prepared essentially according to Example 1 from 2,3-pentamethyleneindole (9.25 g., 0.05 M), sodium hydride (3.0 g. of 48% dispersion, 0.055 M), N,N-dimethyl-beta-phenyl-beta-chloroethylamine (9.20 g., 0.05 M) and dimethylformamide. Product M.P. 120–122° C.

*Analysis.*—Calculated for $C_{23}H_{28}N_2$: C, 83.08; H, 8.49; N, 8.43. Found: C, 82.55; H, 8.55; N, 8.23. Fumarate: M.P. 195–197° C.

*Analysis.*—Calculated for $C_{27}H_{32}N_2O_4$: C, 72.27; H, 7.19; N, 6.25. Found: C, 72.27; H, 7.20; N, 6.18.

EXAMPLE 17

*1-(gamma[4-methyl]piperazinopropyl)-2,3-pentamethyleneindole*

This is prepared essentially according to Example 1 from 2,3-pentamethyleneindole (5.12 g., 0.0276 M), sodium hydride (1.66 g. of 48% dispersion, 0.0304 M), 1-methyl - 4 - )gamma-chloropropyl)piperazine (4.90 g., 0.0276 M) and dimethylformamide (50 ml.). Difumarate M.P. 217.5–218.5° C.

*Analysis.*—Calculated for $C_{29}H_{39}N_3O_8$: C, 62.46; H, 7.05; N, 7.54. Found: C, 62.41; H, 7.33; N, 7.47.

EXAMPLE 18

*1-(gamma-[4-methylpiperazino]propyl)-2,3-hexamethyleneindole*

This is prepared essentially as in Example 1 from 2,3-hexamethyleneindole (5.50 g., 0.0276 M), sodium hydride (1.66 g. of a 48% dispersion, 0.0304 M), 1-methyl-4-(gamma chloropropyl)piperazine (4.90 g., 0.0276 M) and dimethylformamide (50 ml.). Dihydrochloride M.P. 239–242° C.

*Analysis.*—Calculated for $C_{22}H_{33}N_3 \cdot 2HCl$: N, 10.19; Cl 17.17. Found: N, 10.05; Cl, 17.19. Difumarate M.P. 216–217° C.

*Analysis.*—Calculated for $C_{30}H_{41}N_3O_8$: C, 63.06; H, 7.23; N, 7.35. Found: C, 62.60; H, 7.26; N, 7.24.

EXAMPLE 19

*1-(gamma-dimethylaminopropyl)-2,3-pentamethylene-5-nitroindole*

This is prepared essentially as in Example 1 from 2,3-pentamethylene-5-nitroindole (4.6 g., 0.02 M), sodium hydride (1.2 g. of 48% dispersion), gamma-dimethylaminopropylchloride (2.5 g., 0.02 M) and dimethylformamide (50 ml.). Product M.P. 77.5–80° C.

*Analysis.*—Calculated for $C_{18}H_{25}N_3O_2$: C, 68.54; H, 7.99; N, 13.32. Found: C, 68.70; H, 8.09; N, 13.12. Fumarate M.P. 178–180° C.

*Analysis.*—Calculated for $C_{22}H_{29}N_3O_6$: N, 9.74. Found: N, 9.92. Hydrochloride M.P. 220–223° C.

*Analysis.*—Calculated for $C_{18}H_{26}ClN_3O_2$: C, 61.44; H, 7.45; N, 11.94; Cl, 10.08. Found: C, 61.26; H, 7.49; N, 12.04; Cl. 10.04.

The 2,3-pentamethylene-5-nitroindole employed as starting material in this example is prepared by refluxing for one hour a mixture of 51.1 g. of p-nitrophenylhydrazine, 37.5 g. of cycloheptanone, and 900 ml. of absolute ethanol. On cooling, cycloheptanone p-nitrophenylhydrazone crystallizes and is filtered off and dried. M.P., 142–143° C. This is cyclized by refluxing for one hour with four times its weight of glacial acetic acid saturated with dry hydrogen chloride. The cyclized product crystallizes on cooling, and is recrystallized from methanol. M.P., 164–165° C.

*Analysis.*—Calculated for $C_{13}H_{14}N_2O_2$: C, 67.81; H, 6.13; N, 12.17. Found: C, 67.72; H, 6.24; N, 12.15.

EXAMPLE 20

*1-(beta-cyanoethyl)-2,3-hexamethyleneindole*

(a) This is prepared essentially according to Example 9(a) from 2,3-hexamethyleneindole (99.7 g., 0.5 M), acrylonitrile (29.2 g., 0.55 M) and trimethylbenzylammonium methoxide (2 ml. of a 40% methanolic solution) in benzene (300 ml.).

*Analysis.*—Calculated for $C_{17}H_{20}N_2$: C, 80.91; H, 7.99; N, 11.10. Found: C, 81.02; H, 7.80; N, 11.13.

*1-(gamma-aminopropyl)-2,3-hexamethyleneindole*

(b) This is prepared essentially according to Example 9(b) from 1-(beta-cyanoethyl)-2,3-hexamethyleneindole (27.0 g., 0.107 M), lithium aluminum hydride (6.5 g., 0.17 M), benzene (175 ml.) and ether (500 ml.). Product boils at 162–165° C./0.1 mm., $n_D^{20}$ 1.5959.

*Analysis.*—Calculated for $C_{17}H_{24}N_2$: C, 79.64; H, 9.44; N, 10.93. Found: C, 79.61; H, 9.44; N, 10.65.

EXAMPLE 21

*1-(gamma-dimethylaminopropyl)-2,3-pentamethylene-5-aminoindole*

1-(gamma-dimethylaminopropyl)-2,3 - pentamethylene-5-nitroindole fumarate (4.5 g., 0.01 M) is dissolved in 100 ml. of methanol and hydrogenated over 100 mgs. of $PtO_2$ at 45 p.s.i. and 25° G. When hydrogen uptake ceases (after 4 hours), the catalyst is filtered off and the solvent removed under vacuum. The residue is taken up in water, basified with 10% sodium hydroxide, and extracted into ether. The ether layer is water-washed and dried; after filtering, the filtrate is treated with dry hydrogen chloride. The dark gummy precipitate is washed by decantation with ether and the crystallized from isopropyl alcohol. M.P. 260–261°.

*Analysis.*—Calculated for $C_{18}H_{27}N_3 \cdot 2HCl$; N, 11.73; Cl, 19.78. Found: N, 11.70; Cl, 19.50.

EXAMPLE 22

*1-(gamma-di-[2-hydroxyethyl]aminopropyl)-2,3-hexamethyleneindole*

To a solution of 11.5 grams (0.045 moles) 1-(gamma-aminopropyl)-2,3-hexamethyleneindole in 50 ml. of methanol is slowly added 4.4 grams (0.1 mole) of ethylene oxide. After standing 2 days, the solvent is evaporated off and the residue distilled. This yields 12 grams (77.5%) of product; B.P. 245–50°/.001 mm.

*Analysis.*—Calculated for $C_{21}H_{32}N_2O_2$: C, 73.20; H, 9.36; N, 8.13. Found: C, 72.98; H, 9.62; N, 7.92.

EXAMPLE 23

*1-(gamma-dimethylaminopropyl)-2,3-octamethyleneindole*

This is prepared essentially according to Example 1 from 2,3-octamethyleneindole (5.68 g., 0.025 M), gamma-dimethylaminopropyl chloride (3.25 g., 0.025 M), and sodium hydride (1.53 g. of 48% dispersion, 0.028 M) in dimethylformamide (55 ml.). The fumarate melts with decomposition at 174–176° C.

*Analysis.*—Calculated for $C_{25}H_{36}N_2O_4$: C, 70.06; H, 8.47; N, 6.54. Found: C, 69.81; H, 8.20; N, 6.58.

The 2,3-octamethyleneindole required as starting material in this example is prepared by the method of Buu-Hoi (J. Chem. Soc., 2882–8, 1949) as follows: A mixture of 11.87 g. cyclodecanone and 24.9 g. phenylhydrazine is heated to about 100° C. until steam ceases to be evolved. The mixture is cooled, and 15 cc. of glacial acetic acid saturated with dry hydrogen chloride is added cautiously. The mixture is boiled for 5 minutes and poured into water. The crude product is dissolved in benzene, washed with water, dried, and distilled. A viscous oil distilling at 152° C./0.3 mm. Hg is recrystallized from alcohol and water. M.P., 92–93° C.

*Analysis.*—Calculated for $C_{16}H_{21}N$: C, 84.53; H, 9.30; N, 6.16. Found: C, 84.25; H, 9.31; N, 6.13.

EXAMPLE 24

*1-(gamma-piperazinopropyl)-2,3-pentamethyleneindole*

This is prepared essentially according to Example 1 from 2,3-pentamethyleneindole (5.56 g., 0.03 M), sodium hydride (1.8 g., 0.033 M of 48% dispersion), and a benzene solution of N-(gamma-chloropropyl)piperazine (obtained from 7.78 g. of hydrochloride, 0.033 M) in 50 ml. dimethylformamide. Difumarate M.P. 172–174° C. (dec.).

*Analysis.*—Calculated for $C_{28}H_{37}N_3O_8$: C, 61.86; H, 6.86; N, 7.73. Found: C, 61.73; H, 6.96; N, 7.98.

EXAMPLE 25

*1-(beta-morpholinoethyl)-2,3-hexamethyleneindole*

This is prepared essentially according to Example 1 from 2,3-hexamethyleneindole (9.96 g., 0.05 M), sodium hydride (3.0 gr., 0.055 M of 48% dispersion), and N-(chloroethyl)morpholine (7.5 g., 0.05 M) in 75 ml. dimethylformamide. Fumarate M.P. 174–176° C. (dec.).

*Analysis.*—Calculated for $C_{24}H_{32}N_2O_5$: C, 67.27; H, 7.53; N, 6.53. Found: C, 66.97; H, 7.45; N, 6.50.

EXAMPLE 26

*1-(beta-pyrrolidinoethyl)-2,3-hexamethyleneindole*

This is prepared essentially according to Example 1 from 2,3-hexamethyleneindole (7.98 g., 0.04 M), sodium hydride (2.4 g., 0.044 M of 48% dispersion), and N-(chloroethyl) pyrrolidine (5.35 g., 0.04 M) in 60 ml. dimethylformamide. Fumarate M.P. 231–233° C. (dec.).

*Analysis.*—Calculated for $C_{24}H_{32}N_2O_4$: C, 69.88; H, 7.83; N, 6.79. Found: C, 69.94; H, 7.76; N, 6.89.

EXAMPLE 27

*1-(beta-carboethoxyethyl)-2,3-pentamethyleneindole*

(a) Forty grams (0.17 mole) of 1-(beta-cyanoethyl)-2,3-pentamethyleneindole, prepared as described in Example 9 (a), is dissolved in 300 ml. of absolute ethanol. The resulting solution is saturated with dry hydrogen chloride, 2 ml. of water is added, and the mixture boiled under reflux for two hours and then cooled to room temperature. Ammonium chloride, which separates, is filtered off, and the filtrate concentrated in vacuo. The residue is taken up in ether, water-washed, and dried. The solvent is then evaporated and the product distilled. The yield is 31 grams of material boiling between 220 and 225° C. at 0.05 mm. Hg.

*Analysis.*—Calculated for $C_{18}H_{23}NO_2$: C, 75.75; H, 8.12; N, 4.91. Found: C, 75.56; H, 8.26; N, 4.79.

*1-(gamma-hydroxypropyl)-2,3-pentamethyleneindole*

(b) A solution of 1-(beta-carboethoxyethyl)-2,3-pentamethyleneindole (31 grams, 0.11 mole), in 200 cc. dry ether is added slowly to a stirred suspension of 3 grams (0.05 mole) of lithium aluminum hydride in 200 cc. dry ether. After 4 hours refluxing, the reaction mixture is cooled, 12 cc. of water is added dropwise, and then 50 cc. isopropanol. The suspension is filtered, the filtercake washed well with isopropanol, the combined filtrates concentrated, and the residue distilled, B.P. 210–215°/.05 mm. Yield 22 grams (82.3%).

*Analysis.*—Calculated for $C_{16}H_{21}NO$: C, 78.90; H, 8.70. Found: C, 78.84; H, 8.40.

*1-(gamma-bromopropyl)-2,3-pentamethyleneindole*

(c) 5 grams (0.02 mole) of 1-(gamma-hydroxypropyl)-2,3-pentamethyleneindole, 10 cc. 48% aqueous hydrogen bromide, and 2 cc. of conc. sulfuric acid are placed in a 25 cc. round-bottomed flask and refluxed 1½ hours. The mixture is cooled, poured onto ice, and extracted with ether. The extract is washed successively with water, sodium bicarbonate solution, and water, and then dried over sodium sulfate. Solids are filtered off and the filtrate concentrated. The residue is distilled under vacuum yielding 2.8 grams product. B.P. 185–190°/0.05 mm.

*Analysis.*—Calculated for $C_{16}H_{20}NBr$: C, 62.75; H, 6.58; N, 4.57; Br, 26.08. Found: C, 63.88; H, 6.77; N, 4.49; Br, 25.92.

*1-(gamma-[4-(beta-hydroxyethyl)piperazino] propyl)-2,3-pentamethyleneindole*

(d) Eight grams (0.026 moles) 1-(gamma-bromopropyl) - 2,3 - pentamethyleneindole and N - (beta-hydroxyethyl) piperazine (3.9 grams, 0.03 mole) in 100 cc. xylene are heated under reflux for 24 hours. After cooling, the mixture is washed with aqueous potassium carbonate, then with water. The organic layer is dried over magnesium sulfate, and, after filtration, the solution is diluted with ether, and dry hydrogen chloride is added. A precipitate is separated and twice crystallized from alcohol. M.P. 209–210°.

*Analysis.*—Calculated for $C_{22}H_{35}N_3Cl_2O$: N, 9.82; Cl, 16.55. Found: N, 9.52; Cl, 16.70.

EXAMPLE 28

*1-(gamma-dimethylaminopropyl)-2,3-pentamethylene-5-methylindole*

This is prepared by the procedure of Example 1 substituting 2,3-pentamethylene - 5 - methylindole for the 2,3-pentamethyleneindole employed in Example 1. The product is isolated and crystallized as the fumaric acid salt, M.P. 141.5–145° C.

*Analysis.*—Calculated for $C_{23}H_{32}O_4N_2$: C, 68.97; H, 8.05; N, 7.00. Found: C, 68.75; H, 8.01; N, 6.96.

The 2,3-pentamethylene - 5 - methylindole employed as starting material in this example is prepared from cycloheptanone and p-methylphenyl-hydrazine by the process outlined in the second paragraph of Example 11. M.P. 123–127° C.

*Analysis.*—Calculated for $C_{14}H_{17}N$: C, 84.37; H, 8.60; N, 7.03. Found: C, 84.36; H, 8.52; N, 6.94.

EXAMPLE 29

*1-(gamma-methylaminopropyl)2,3-hexamethyleneindole*

(a) 1 - (beta-carbomethoxyethyl) - 2,3 - hexamethyleneindole is prepared from 75.8 g. of 1-(beta-cyanoethyl)-2,3-hexamethyleneindole (prepared as described in Example 20 (a)) by following the general procedure of Example 27 (a), using 1250 ml. of methanol and 5 ml. of water. The product has a melting point of 62–64° C.

*Analysis.*—Calculated for $C_{18}H_{23}O_2N$: C, 75.75; H, 8.12; N, 4.91. Found: C, 75.49; H, 8.10; N, 4.94.

(b) 1-(beta-carbomethamidoethyl) - 2,3 - hexamethyleneindole is prepared by dissolving 10 grams of 1-(beta-carbomethoxyethyl) - 2,3 - hexamethyleneindole (prepared as in part (a) of this example) in 50 ml. of methanol saturated at 0° C. with methyl amine. After standing at room temperature for 48 hours, the solvent is evaporated by heating on the steam bath. Recrystallization from methanol gives a colorless product melting at 115–116° C.

*Analysis.*—Calculated for $C_{18}H_{24}N_2O$: C, 76.05; H, 8.50; N, 9.86. Found: C, 75.83; H, 8.50; N, 9.84.

(c) Eleven grams of the product of part (b) of this example is dissolved in about 500 ml. of benzene and then added to a solution of 10 grams of lithium aluminum hydride dissolved in 1000 ml. of anhydrous ether. After decomposition of the complex by addition of about 25 ml. of water, the mixture is filtered, the filtrate dried, and the solvent evaporated off. The residue is distilled to yield 1 - (gamma-methylaminopropyl) - 2,3-hexamethyleneindole, B.P. 160–170° C. at 0.1 mm. Hg. A portion of the base is converted to the hydrochloride salt, M.P. 180–181° C.

*Analysis.*—Calculated for $C_{18}H_{26}N_2$ (base): C, 79.95; H, 9.69; N, 10.36. Found: C, 79.83; H, 9.82; N, 10.25. Calculated for $C_{18}H_{27}N_2Cl$ (hydrochloride): C, 70.45; H, 8.87; N, 9.13. Found: C, 70.76; H, 9.00; N, 9.41.

When utilizing the novel compounds (I) of the present invention by oral administration for any of the purposes referred to hereinbefore, it may be desirable to combine them with suitable solvents, carriers, buffers, fillers and the like, as also referred to hereinbefore. Preferably, capsules containing the compounds per se in the form of their bases or the pharmaceutically acceptable acid-addition salts thereof, may be prepared under sterile conditions. In such forms, the compounds of the invention may be conveniently administered in total daily dosage amounts of from about 15 to about 120 mg. per day, as by ingestion of a requisite number of capsules, each containing 15 mg. of compound, for example. With such a regimen, the compounds of the invention are particularly indicated for clinical application in cases of depression, including psychomotor retardation, despondency, sadness, fatigue, lack of interest or emotional response, helplessness, hopelessness, pessimism, feelings of incapacity, inferiority or despair, suicidal drive, delusions of guilt or unworthiness, and psychosomatic complaints.

The initial average daily dose indicated for various types of depression depending upon severity of effective disorder are exemplified in Table I below.

TABLE I

| Depression type: | Daily dose, mg. |
|---|---|
| Neurotic | 45–60 |
| Periodic | 45–90 |
| Reactive | 30–60 |
| Schizoaffective | 60–120 |
| Manic | 60–120 |
| Involution melancholia | 40–75 |
| Pre- and post-partum | 30–75 |

The foregoing dosages may be reduced, once a positive response is obtained, with effective employment thereafter of an average maintenance dose ranging from 15 to 45 mg. daily.

The following examples are illustrative of the beneficial clinical uses of a representative compound of the invention:

Example 30

Ten psychotic patients (5 females and 5 males) ranging in age from 22 to 57 years, with a duration of illnesses from 1 to 35 years, were treated with 1-(gamma-dimethylaminopropyl) - 2,3 - hexamethyleneindole hydrochloride prepared by the procedure of Example 3. The patients, who had depressive symptoms such as withdrawal, apathy, sadness, hopelessness, were put on the following dosage regimens as shown in Table II below.

TABLE II

| Week: | Mg., t.i.d., oral |
|---|---|
| 1 | 30. |
| 2 | 60. |
| 3 to 4 | 120. |
| 5 | 30+15 mg. dextroamphetamine sulphate. |
| 6 | Medication discontinued. |

Electroencephalogram (EEG) and electrocardiogram (EKG) studies before, during, and after treatment were done. Extensive laboratory studies, complete blood and urine analysis with liver function tests (SGOT) and electrolyte studies were carried out at two-weekly intervals, with the results given below:

The depression symptoms of each of the 10 patients were markedly alleviated. With respect to the EEG studies, only 2 patients showed $\beta$ activity at 60 and 120 mg. t.i.d. dosage, and both of these patients were males with psychosis. The SGOT, alkaline phosphatase and serum bilirubin remained normal throughout. No changes were noted in hematocrit, hemoglobin, white blood count or differential. Urinalyses showed no change.

Example 31

A group of 13 acute psychotic patients were tested with loading doses of 1-(gamma-dimethylaminopropyl)-2,3-hexamethyleneindole hydrochloride, starting with 15 mg. on up to 60 mg. initially. Each day, the dose was increased by 50 percent. The duration of drug administartion ranged from one acute dose in two patients of 60 and 90 mg., respectively, three acute doses three days apart in two patients, 8 day administration of 90 mg. daily and 5 mg. dexedrine in 3 cases. In the rest of the group rapid increases in dosage to optimum of 90 or 120 mg. daily over 6 to 12 days, were administrated. In all cases, marked improvement in depressive symptoms was obtained.

During the aforesaid administration, continuous observations on blood pressure, pulse, weight, and general medical status were carried out daily. Hematology was carried out pre- and post-acute study, as well as urinalysis, alkaline phosphatase, cephalin flocculation, thymol turbidity and SGOT. The results of these studies are summarized below:

RESULTS (a) With respect to the acute dosages administered in 2 cases: No change in blood pressure, pulse or weight; no complaints, and liver function and blood studies were unchanged.

(b) With respect to the intermittent increasing acute dosages administered in 2 cases: No changes noted except that both patients noted to be "calmer" during last trial at highest dosage.

(c) With respect to the combination of the drug and dexedrine administered in 3 cases: Slight elevation of pulse in all three cases of 10 per minute average was noted; no significant change in pulse pressure. No changes in hematology or liver function tests. Intermittent pruritus in one case during trial, disappeared while still on medications.

(d) With respect to the step-wise progressive daily increase dosage administered in 6 cases: No changes in physiological, hepatic or renal function; no change in hematology.

One case had mild pruritus with possible hives and one case vomited and was found to have epigastric tenderness. However, these symptoms were relieved by Gelusil and did not recur on continued treatment.

Example 32

Seventy-four office patients having various psychiatric conditions involving depression symptoms, were put on a regimen as indicated in Table I of Example 29, of 1-(gamma - dimethylaminopropyl) - 2,3 - hexamethyleneindole hydrochloride. In several of the cases, where indicated, the compound of the invention was administered in combination with a phenothiazine or chlordiazepoxide.

In all cases, alleviation of the depression symptoms was obtained without adverse side reactions. In this connection, seventy-four patients had hematological studies including hemoglobin, RBC, WBC, differential and urinalysis. Thirty-eight patients had liver function studies performed such as thymol turbidity, cephalin flocculation, alkaline phosphatase and SGOT. Fifteen patients had all the above liver function tests excluding SGOT and 20 patients had only cephalin fluocculation and alkaline phosphatase. No abnormalities were noted in any of these cases.

Example 33

In this series of cases, 80 patients with depressions of various diagnostic categories were orally administered 1 - (gamma - dimethylaminapropyl) - 2,3-hexamethyleneindole hydrochloride mg. The cases, male and female adolescents and adults, included the following diagnostic categories: reactive depressions, 13; psychoneurotic depressive reactions, 41; involutional depressive reactions, 6; psychotic depressive reactions, 3; manic-depressive, depressed, 1; and one case of an agitated anxiety depressive reaction. The mean percentage of satisfactory results in alleviating depression with these different classifications are 79% of the reactive depressions; 78% of the psychoneurotics; 43% of the schizophrenics; 67% of the involutionals; 67% of the psychotics; 100% of the manic depressives. No satisfactory responses were obtained in the one case of a chronic brain syndrome and in the case of the agitated anxiety depressive reaction.

Only 12 patients reported side effects in this series of 80 (15%). Summarizing them, there were 2 patients who complained of increased perspiration, which was transient in one, as it disappeared with the continuation of treatment and the addition of a benzodiazepine and persistent in the other, who discontinued the medication on her own.

Of the remaining ten patients, seven presented multiple side effects; the most persistent one was a parkinsonism, occurring in one patient. The most common was anxiety in the form of apprehension and restlessness, which occurred in four patients. The second most common was general malaise, occurring in three patients. Dizziness was noted in two patients, lethargy or increased depression in two, blurred vision, anorexia and "precordial distress" (with no physical or EKG signs) and headache in one patient. In all of these cases, except the one with parkinsonism, the side effects disappeared on continuation, reduction or interruption of treatment.

*Example 34*

Sixty-nine cases were treated by oral administration of 1 - (gamma - dimethylaminopropyl)2,3-hexamethyleneindole hydrochloride. The cases included 25 psychoneurotic depressive reactions, 20 periodic, 3 reactive depressions, 6 schizo-affective psychoses, 12 involutional depressive reactions, 1 post-partum, 1 pre-partum and 1 senile depression. Forty-two of these patients investigated by one psychiatrist were rated as moderately severe to severe depressions, most of them being failures from other treatment measures.

The mean results showed a favorable response in 60% of the psychoneurotics, 70% of the periodics, 100% of the reactives, 33% of the schizo-affectives, 58% of the involutionals and 100% of the pre-partum and senile depressions.

Fifty-eight of these 69 patients underwent a battery of laboratory analyses. These tests included CBC, urinalyses, SGOT, thymol turbidity, cephalin flocculation, and alkaline phosphatase.

In one patient, a post tubercular, the alkaline phosphatase rose from the original 2 to 10 figures still within normal limits. Side effects were reported in 32 patients, of these 19 complained of one and the rest of two or more of these side reactions. The most frequent one found was increased perspiration, dry mouth was next in number, as two patients reported it alone and four more in combination with other symptoms; blurry vision alone was reported in two additional patients and in three additional ones with other complaints. Jitteriness was found as a complaint by itself in three patients, headache in one patient, and combined with dry mouth in an additional one. Palpitation alone was experienced in one case, and, together with other symptoms in four more, in the form of tachycardia (2 cases) and rapid pulse (1 case). One case complained of agitation and three more of a combination of this symptom, with restlessness (1 case) and excitability (1 case). One case was found to suffer from mild transitory hypotension, which disappeared in spite of the continuation of treatment and one of a transitory urinary urgency. There was one additional patient who complained of insomnia, but it was reported by the investigator that this might not be drug related, due to the subject's antecedents. Finally, in other patients with combined symptoms, the following were also recorded: light headedness (1), weakness (1), flushed face (4), chills (1), tremors of upper extremities (1), abdominal discomfort (2), pyrosis (1), dilated pupils (1), and incoordination (1).

As in all other clinical applications of the compound, there were no reports of hepatological changes, renal changes, or weight loss. In order to obviate those side reactions experienced, which are all of a comparatively minor and transitory nature, the following has been done successfully: In cases of stimulation, the dosage has either been reduced or a phenothiazine has been added to the regimen. In cases of insomnia, the dose has been reduced or a nocturnal sedative has been included in the regimen. In cases of headache, palpitations, or jitteriness; the dose has merely been reduced.

*Example 35*

Twenty-five cases (male and female adults) suffering from various types of depression, of which 12 were manic-depressive, depressed, 8 were psychoneurotic depressives, 3 were schizophrenic reactions with depression and 2 were involutional depressions, were placed on a regimen of 1 - (gamma - dimethylaminopropyl)-2,3-hexamethyleneindole hydrochloride.

The favorable results were 75% for the psychoneurotics, 83% for the manic depressives, 67% for the schizophrenic reactions with depression, and 50% for the involutional depressions. There was only one patient who complained of a side effect, psychokinetic stimulation, which disappeared rapidly after dosage reducement (from 60 mg. to 30 mg.) and the addition of a tranquilizer.

Laboratory data were obtained in 20 of these patients, including complete blood counts, alkaline phosphatase and cephalin flocculation. The data, taken before treatment and again after two months of treatment, were essentially normal.

We claim:
1. The method of treating a human having depression symptoms which method comprises orally administering to said human a therapeutically effective amount of a pharmaceutically acceptable acid-addition salt of 1-(gamma-dimethylaminopropyl)-2,3-hexamethyleneindole.

2. The method of claim 1 for treating a human having depression symptoms, wherein the pharmaceutically acceptable acid-addition salt of 1-(gamma-dimethylaminopropyl)-2,3-hexamethyleneindole is the hydrochloride.

3. The method of claim 1 for treating a human having depression symptoms wherein the therapeuticallly effective amount is administered in a regimen of from about 15 to about 120 mg. per day.

References Cited

UNITED STATES PATENTS 2,541,211   2/1951   Cusic _____ 260—315

ALBERT T. MEYERS, *Primary Examiner.*

JULIAN S. LEVITT, *Examiner.*

STANLEY J. FRIEDMAN, *Assistant Examiner.*